J. J. RUEL.
MEANS OF SUSPENSION FOR MOTOR CARS AND OTHER MOTOR DRIVEN VEHICLES.
APPLICATION FILED MAY 28, 1915.
1,189,629.
Patented July 4, 1916.
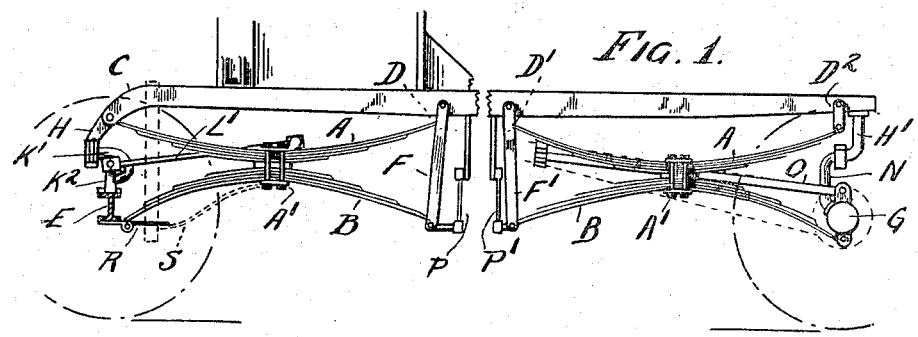
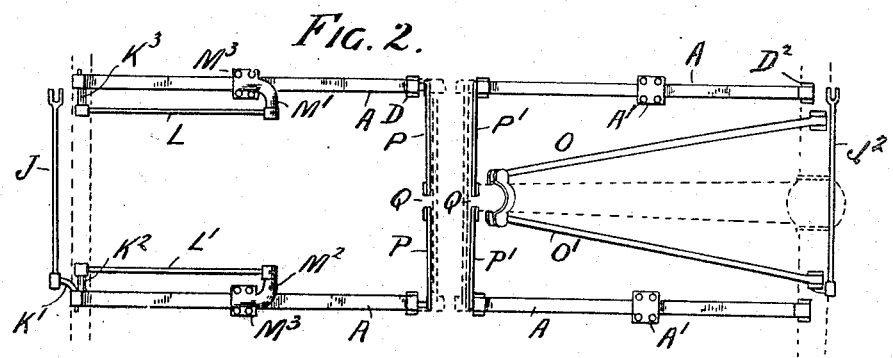
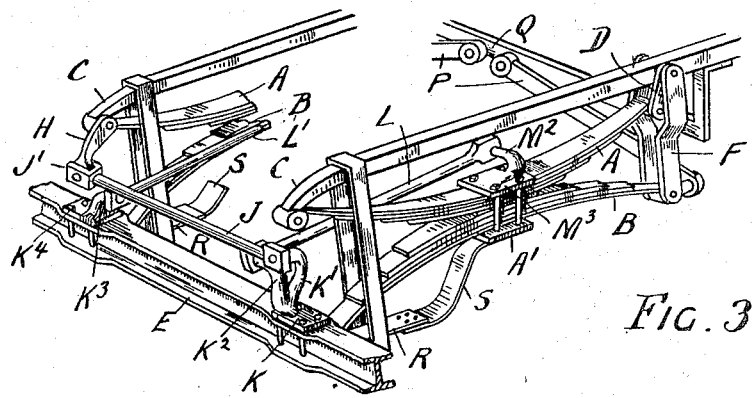
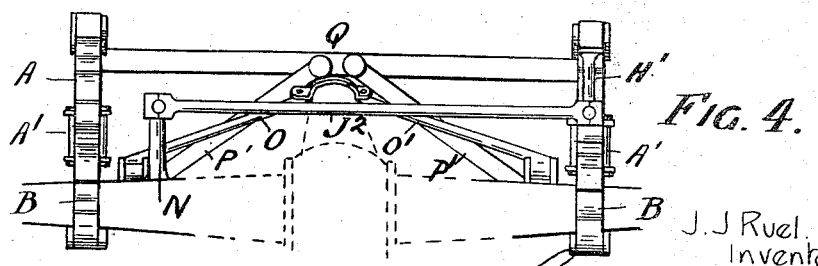
J. J. Ruel, Inventor
Attorney.

UNITED STATES PATENT OFFICE.

JOHN JOSEPH RUEL, OF MELBOURNE, VICTORIA, AUSTRALIA.

MEANS OF SUSPENSION FOR MOTOR-CARS AND OTHER MOTOR-DRIVEN VEHICLES.

1,189,629.     Specification of Letters Patent.     Patented July 4, 1916.

Application filed May 28, 1915. Serial No. 30,908.

*To all whom it may concern:*

Be it known that I, JOHN JOSEPH RUEL, a subject of the King of Great Britain, residing at No. 84 Collins street, Melbourne, in the State of Victoria and Commonwealth of Australia, theatrical manager, have invented Improved Means of Suspension for Motor-Cars and other Motor-Driven Vehicles, of which the following is a specification.

This invention has been designed for the purpose of giving much greater resiliency to the motor car or other motor driven vehicle to which my improved means are applied, thus mitigating to a considerable extent the jolting which occurs at present in the case of such vehicles fitted with the ordinary springs.

A further advantage of my invention is that with it the wheel base of the vehicle to which it is applied is considerably increased.

The invention consists essentially in the substitution for the semi-elliptical or complete elliptical springs now used, of two semi-elliptical springs rigidly connected together back to back at or about the middle of their length. The upper semi-elliptical spring is therefore convex while the lower one is concave.

The invention further consists in the means for attaching said springs to the chassis and for regulating the movement of both the springs and axles.

Referring to the sheet of drawings hereto annexed:—Figure 1 is a side elevation illustrating my springs and the means of attaching them to the chassis. Fig. 2 is a plan view of Fig. 1. Fig. 3 is a perspective view of part of the front suspension, and Fig. 4 is a rear view in elevation of the chassis.

A and B are the two semi-elliptical springs placed back to back and clamped together at their center by means of a clip $A^1$. The upper or convex spring A of the front suspension is attached at one end to the projecting end of the dumb iron C, its other end being attached to a short shackle D depending from said dumb iron. The upper or convex spring of the rear suspension is attached at each end to short shackles $D^1$ and $D^2$, depending from said dumb iron. The lower or concave spring B of the front suspension is attached at one end to the front axle E, its other end being attached to a long shackle F depending from the said dumb iron. The lower or concave spring of the rear suspension is attached at one end to the rear axle G and at its other end to a long shackle $F^1$ depending from said dumb iron. To one of the dumb irons C at the front of the chassis frame is pivoted an extension H to which is connected a rod J by means of a universal joint $J^1$. This rod extends horizontally across the front of the chassis and is connected to the arm $K^1$ of a bracket K attached to the front axle E. This rod is free to move radially on its pivot and permits of freedom of motion in all directions except laterally which is restricted. L and $L^1$ are longitudinal rods, one of which is attached at one end to arm $K^2$ of bracket K and the other to arm $K^3$ of bracket $K^4$. The other ends of said rods are connected respectively to arms $M^1$ and $M^2$ of brackets $M^3$ on the semi-elliptical springs of the front suspension. These rods are for the purpose of restricting undue longitudinal motion. A rod $J^2$ is provided for the rear suspension to fulfil a similar function to the rod J. The rod $J^2$ extends from a bracket arm $H^1$ at the rear end of the chassis frame to a bracket N on the rear axle at the opposite side of the frame. Two longitudinal torque rods O and $O^1$ connecting the rear axle to the chassis frame are also used as at present in motor cars.

P and $P^1$ are rods which are connected to the long shackles F and $F^1$ by a suitable joint and to a central point Q of a transverse member of the chassis frame. These rods prevent any undue lateral movement of the depending ends of the long shackles $F^1$ and the springs B attached thereto.

R is a flat plate fastened at one end to the front axle E. The said plate R extends backward and is connected by a leather strap S to the clip $A^1$. In the event of the concave spring B breaking it is caught and supported either by the said plate or strap.

What I do claim as my invention, and desire to secure by Letters Patent, is:—

1. Suspension means, for the chassis of a motor-driven vehicle, comprising approximately semi-elliptical upper and lower springs rigidly secured together at about the middle and with their convex faces abutting, means for pivotally connecting each end of the upper spring to the chassis, at least one of said ends being connected through the medium of a shackle, means for pivotally connecting one end of the lower spring to an axle of the vehicle, and a second shackle pivotally connecting the other end of said lower spring to the chassis.

2. Suspension means, for the chassis of a motor-driven vehicle, comprising two sets of approximately semi-elliptical upper and lower springs rigidly secured together at about the middle and with their convex faces abutting, said sets being arranged longitudinally of the vehicle and one set on each side thereof, means for connecting each of said sets of springs partly to the chassis and partly to an axle of the vehicle, an extension pivoted to one side of the chassis on an axis transverse to the chassis, a rod jointed at one end to said extension and extending transversely of the chassis, and means for pivotally connecting the other end of said rod to said axle.

3. Suspension means, for the chassis of a motor-driven vehicle, comprising a pair of approximately semi-elliptical upper and lower springs rigidly secured together at about the middle and with their convex faces abutting, means for connecting said springs partly to the chassis and partly to an axle of the vehicle, and a pair of rods pivotally connected at one end to the said axle and at the other end to projections mounted on substantially the middle of the abutting springs.

4. Suspension means, for the chassis of a motor-driven vehicle, comprising approximately semi-elliptical upper and lower springs rigidly secured together at about the middle and with their convex faces abutting, means for pivotally connecting each end of the upper spring to the chassis, at least one of said ends being connected through the medium of a shackle, means for pivotally connecting one end of the lower spring to an axle of the vehicle, a second shackle pivotally connecting the other end of said lower spring to the chassis, and a rod extending laterally across the chassis and pivotally connected at one end to said second shackle and at the other end to a part of the chassis.

In testimony whereof I have signed my name to this specification in the presence of two subscribing witnesses.

JOHN JOSEPH RUEL.

Witnesses:
WALTER S. BAYSTON,
FRANK BAYSTON.

Copies of this patent may be obtained for five cents each, by addressing the "Commissioner of Patents, Washington, D. C."